(12) United States Patent
Muruganandam et al.

US011300052B2

(10) Patent No.: US 11,300,052 B2
(45) Date of Patent: Apr. 12, 2022

(54) METHOD OF HOLDING FLAME WITH NO COMBUSTION INSTABILITY, LOW POLLUTANT EMISSIONS, LEAST PRESSURE DROP AND FLAME TEMPERATURE IN A GAS TURBINE COMBUSTOR AND A GAS TURBINE COMBUSTOR TO PERFORM THE METHOD

(71) Applicant: INDIAN INSTITUTE OF TECHNOLOGY (IIT MADRAS), Chennai (IN)

(72) Inventors: T. M. Muruganandam, Chennai (IN); S. R. Chakravarthy, Chennai (IN); R. S. Preethi, Chennai (IN); N. Rajabharathi, Chennai (IN); V. Deepika, Chennai (IN); S. Shanmugaprabhu, Chennai (IN)

(*) Notice: Subject to any disclaimer, the term of this patent is extended or adjusted under 35 U.S.C. 154(b) by 282 days.

(21) Appl. No.: 16/318,005

(22) PCT Filed: Jul. 14, 2017

(86) PCT No.: PCT/IN2017/050291
§ 371 (c)(1),
(2) Date: Jan. 15, 2019

(87) PCT Pub. No.: WO2018/011827
PCT Pub. Date: Jan. 18, 2018

(65) Prior Publication Data
US 2019/0301369 A1    Oct. 3, 2019

(30) Foreign Application Priority Data

Jul. 15, 2016   (IN) .............................. 201641024206

(51) Int. Cl.
*F02C 7/22* (2006.01)
*F23R 3/12* (2006.01)
(Continued)

(52) U.S. Cl.
CPC ................ *F02C 7/222* (2013.01); *F23R 3/02* (2013.01); *F23R 3/06* (2013.01); *F23R 3/12* (2013.01);
(Continued)

(58) Field of Classification Search
CPC ...... F23R 3/00; F23R 3/12; F23R 3/14; F23R 3/16; F23R 3/002; F23R 3/20; F23R 3/26;
(Continued)

(56) References Cited

U.S. PATENT DOCUMENTS

| 4,763,481 A | * | 8/1988 | Cannon ................... F23D 11/12 60/737 |
| 9,371,997 B2 | * | 6/2016 | LeBegue ................... F23R 3/28 |

(Continued)

OTHER PUBLICATIONS

Gas turbine combustion Alternative Fuels and Emissions, A Lefebvre and D. Ballal, 3rd Ed. 2010 (Year: 2010).*
(Continued)

*Primary Examiner* — Todd E Manahan
*Assistant Examiner* — Rodolphe Andre Chabreyrie
(74) *Attorney, Agent, or Firm* — Rumit Ranjit Kanakia (57) ABSTRACT

A swirl mesh lean direct injection concept for distributed flame holding for low pollutant emissions and mitigation of combustion instability. The invention further relates to a new method for flame holding with least pressure drop and flame temperature, in gas turbine engine combustors, wherein the liner of the combustor is partially or fully replaced with a "swirl mesh". The invention has lean direct injection for fuel distribution over several points in gas turbine combustors along with swirl arrangement for air injection which provides low pollutant emission and low combustion instability.

10 Claims, 6 Drawing Sheets

(51) Int. Cl.
*F23R 3/14* (2006.01)
*F23R 3/06* (2006.01)
*F23R 3/02* (2006.01)
*F23R 3/28* (2006.01)

(52) U.S. Cl.
CPC ................ *F23R 3/14* (2013.01); *F23R 3/286* (2013.01); *F05D 2240/35* (2013.01); *F23R 2900/00014* (2013.01)

(58) Field of Classification Search
CPC .... F23R 3/34; F23R 3/286; F23R 3/06; F05D 2240/35
See application file for complete search history.

(56) References Cited

U.S. PATENT DOCUMENTS

| | | | | |
|---|---|---|---|---|
| 9,709,279 | B2* | 7/2017 | Crothers | F23R 3/46 |
| 9,810,148 | B2* | 11/2017 | Propheter-Hinckley | F23R 3/06 |
| 9,845,956 | B2* | 12/2017 | Ziminsky | F23R 3/42 |
| 10,094,568 | B2* | 10/2018 | Bethke | F23R 3/286 |
| 10,690,350 | B2* | 6/2020 | Berry | F23R 3/286 |
| 2003/0061594 | A1* | 3/2003 | Tsuchiya | G06T 7/001 702/82 |
| 2010/0050642 | A1* | 3/2010 | Ziminsky | F23D 14/62 60/737 |
| 2013/0061594 | A1* | 3/2013 | Stewart | F23R 3/10 60/740 |
| 2013/0062425 | A1* | 3/2013 | Belsom | F23M 20/005 239/1 |
| 2016/0245525 | A1* | 8/2016 | Snyder, III | F23R 3/346 |
| 2017/0284677 | A1* | 10/2017 | Horikawa | F23R 3/10 |

OTHER PUBLICATIONS

Wikipedia internet page extracted via wayback machine, https://en.wikipedia.org/wiki/Honeycomb_conjecture, Sep. 2014.*

* cited by examiner

METHOD OF HOLDING FLAME WITH NO COMBUSTION INSTABILITY, LOW POLLUTANT EMISSIONS, LEAST PRESSURE DROP AND FLAME TEMPERATURE IN A GAS TURBINE COMBUSTOR AND A GAS TURBINE COMBUSTOR TO PERFORM THE METHOD

CROSS REFERENCE TO RELATED APPLICATIONS

This U.S. patent application is a national stage of International Application PCT/IN2017/050291 filed on Jul. 14, 2017, which in turn claims benefits to Indian Provisional Patent Application IN 201641024206 filed on Jul. 15, 2016.

FIELD OF THE INVENTION

The present invention relates to a means for distribution of air and fuel, more particularly relates to an arrangement of swirlers, flame holders, burners etc., to provide well distributed flame in gas turbine engine combustor systems.

BACKGROUND OF THE INVENTION

A combustor also known as a burner, combustion chamber or flame holder is a component or area of a gas turbine, ramjet, or scramjet engine and designed to help maintain continual combustion. Combustors play a crucial role in determining many of an engine operating characteristics, such as fuel efficiency, levels of emissions and transient response (the response to changing conditions such a fuel flow and air speed). The upstream end of the combustor typically houses the fuel injection nozzles and is called the head end of the combustor. This section is the region which has the primary flame holding mechanisms, which are usually termed 'burners' or flame holders and the volume of the combustor which has the main flame holding mechanism, is called the primary zone. The remaining sections of the combustor are related to adding extra air to the hot gases produced by the flame in order to decrease the temperature such that material limits of the turbine are not crossed. This section is called the secondary zone of the combustor.

Figure 1:
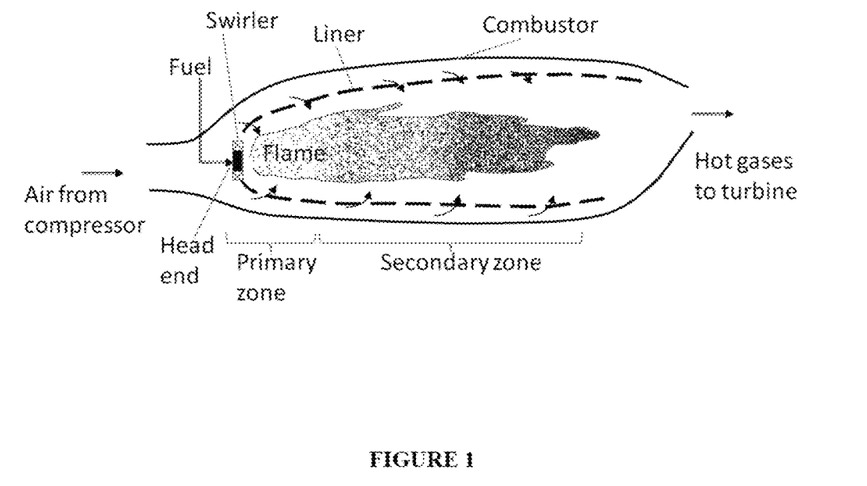
FIG. 1 shows schematic cross section of typical gas turbine combustor.

Most engine applications require addition of fuel to the working fluid in order to extract work/energy from it later in the process. Swirl-dump burners are used in both transportation (aviation, marine and rail) and power generation gas turbine combustors with high velocities of air. Most common combustor configurations use a swirl-dump burner surrounded by a duct forming the combustor (FIG. 1). The swirl burner typically consists of single or multiple sets of swirlers. The swirl flow causes low velocity regions for the flame to stabilize in the combustor. These swirlers have very small passages between them for the flow of air and thus have high pressure losses. This is required to redirect most of the air around the head end in order to mix with the hot gases later as secondary or tertiary air. These pressure losses lead to lesser efficiency of the engine on the whole. The requirement of holding a flame against the high velocity forces designers to send all the fuel through a swirler, causing high fuel-to-air ratio for best flame holding. However, this increases the flame temperature and thus the $NO_x$ emissions along with increase in combustor weight due to thermal protection linings. The approach in the past to decrease the pollutants is to burn a little leaner, causing the flame to be more susceptible to combustion instability. There are a few designs which have multiple swirler assemblies in the head end of the combustor, which may have a lesser pressure drop in the head end due to area change, along with lower combustion instability. They ensure that each of the swirling jets from the different swirlers are separated by a distance, in order to ensure good supply of secondary air, and this decreases interaction between the flames and thus they are almost individual burners at the head end of the combustor.

Previously many attempts have been made to control low fuel operating condition for maintenance of stable combustion and to reduce $NO_x$ emissions from combustion sources in hopes of reducing the air pollution associated with the burning of fuels. For example U.S. Pat. No. 4,763,481 A provides a multi-burner combustor which exhibits effective wall cooling combined with good flame stabilization in all operating conditions in combination with improved combustion exit temperature distribution, reduced oxides of nitrogen emission, and improved combustion performance when burning low heating-value fuels. U.S. Pat. No. 5,879,148 A discusses about mechanical swirler for the combustion of a thoroughly premixed fuel/air stream without the use of a stabilizing recirculation zone. This mechanical swirler used to induce angular momentum into a feed gas stream. As with the air-swirler, the mechanical swirler creates a stable flow pattern that anchors the flame at the point where the flame speed balances the mass flow rate of the fuel-air mixture, without the use of a stabilizing recirculation zone.

The present design brings the swirlers very close to each other in a hexagonal packing arrangement, minimizing the solid mass between the swirlers. This causes the pressure loss across them to be very minimal. The flames that are stabilized from them interact very closely and thus help each other stabilize against higher velocities.

SUMMARY OF THE INVENTION

The present invention relates to a means for distribution of air and fuel, more particularly relates to an arrangement of swirlers, flame holders, burners for well distributed flame in gas turbine engine combustor systems.

The present invention relates to a new method for flame holding in gas turbine combustors with least pressure drop and lower flame temperatures.

An aspect of the invention relates to turbine engine combustor having swirlers in a hexagonal packing arrangement, minimizing solid mass between the swirlers, with minimal pressure loss.

One aspect of the invention relates to a direct fuel distribution using swirl mesh lean injection for flame holding.

Yet in other aspect the invention shows that fuel is distributed through many of these swirlers and injected directly into the combustor with each swirler with injection operating in overall lean conditions. The flames that are stabilized from them interact very closely and thus help each other stabilize against higher velocities. This, in turn, increases combustion efficiency. The flames need to burn only small amount of fuel each and thus are very short, but are distributed along the liner. This gives very low NOx emissions due to low residence times in high temperature zone. The distributed flame also helps reduce combustion instability problems in combustors. Since high temperature zones are reduced, and the air is flowing through most areas of the liner, the heat transfer to the liner will be lower and thus it does not need thermal protection. This decreases weight of the combustion chamber in an engine. The distribution of air through various locations in the liner is dictated by the swirler distribution and fuel distribution is dictated by the injection distribution in the swirlers. This gives a good handle on the final temperature distribution in the combustor exit and to avoid large pattern factors.

Another aspect of the invention relates to fuel distribution across different locations of the burner allowing the fuel-air-ratio to be in a very lean range, decreasing the pollutant emissions without affecting flame holding.

Wherein, the fuel is injected into either the center of each of the swirlers, or at the periphery between adjacent swirlers, or both. This has an advantage of having lower pollutant emissions as the flame temperature is lowered and the residence time for air in high temperature zone is lesser. The wall thickness of the swirler vanes can be higher than usual in this arrangement since there are not much pressure losses otherwise. This combustor also has the advantage of a variety of choices of fuel injection locations for part load operations. This option further gives an active control option for combustion instability as one has different fuel flow rates for different injectors. This distributed combustion along with variability in fuel injection patterns helps decrease combustion instability in the combustor.

Wherein, the said flame holding is used in gas turbine engine combustors at high flow velocities providing good flame stabilization.

Wherein, the proposed burner may also have some other applications in industrial oil/gas fired furnaces and many gas turbine engine companies are interested in flame holdings that have the advantages of low pollutant emissions and no combustion instability.

One of ordinary skill in the art may appreciate the many possible applications and variations of the present invention based on the following examples of possible embodiments of the present invention.

BRIEF DESCRIPTION OF THE DRAWINGS

The accompanying figures, which are incorporated in and constitute a part of this specification, illustrate several aspects and together with the description serve to explain the principles of the invention.

FIG. 3 shows (a) Individual hexagonal swirler, (b) Hexagonal closed pack structure of swirlers on liner.

DETAILED DESCRIPTION OF THE INVENTION

The present invention relates to a new method for flame holding in gas turbine combustors with least pressure drop and flame temperature.

An aspect of the invention relates to turbine engine combustor having swirlers in a hexagonal packing arrangement, minimizing solid mass between the swirlers with minimal pressure loss.

One aspect of the invention relates to a direct fuel distribution using swirl mesh lean injection for flame holding.

Another aspect of the invention relates to fuel distribution across different locations of the burner allowing the fuel-air-ratio to be in a very lean range, decreasing the pollutant emissions without affecting flame holding.

Wherein, the fuel is injected into either the center of each of the swirlers, or at the periphery between adjacent swirlers, or both. This has the advantage of having lower pollutant emissions as the flame temperature is lowered and the residence time for air in high temperature zone is lesser. This combustor also has the advantage of a variety of choices of fuel injection locations for part load operations. This option further gives an active control option for combustion instability as one has different fuel flow rates for different injectors. This distributed combustion along with variability in fuel injection patterns helps decrease combustion instability in the combustor. The wall thickness of the swirler vanes can be higher than usual in this arrangement since there are not much pressure losses otherwise.

Wherein, the said flame holding is used in gas turbine engine combustors at high flow velocities providing good flame stabilization.

Wherein, the proposed burner may also have some other applications in industrial oil/gas fired furnaces and many gas turbine engine companies are interested in flame holdings that have the advantages of low pollutant emissions and combustion instability.

One embodiment of the invention relates to lean direct injection in a swirl mesh concept which lowers pollutant emission, as the flame temperature is lowered and residence time for air in high temperature zone becomes lesser.

One embodiment of the invention relates to a design of the swirl mesh wherein, the wall thickness of the swirler vanes is higher favoring lesser pressure losses.

One embodiment of the invention relates to the use of lean distributed injection favors a low local fuel flow rate at the injection point where, the fuel is distributed across multiple locations of the swirl mesh liner.

Figure 2:
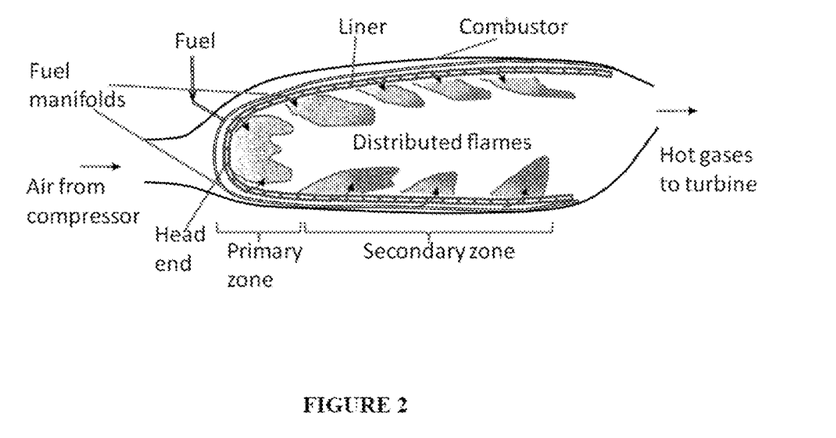
FIG. 2 depicts schematic sketch of the proposed combustor liner.

This invention presents a new way of letting air enter the combustor of a gas turbine engine. The liner of the combustor in this design (FIG. 2) is partially or fully replaced with a "swirl mesh" which is a set of hexagonal swirlers meshed with each other in a hexagonal closed pack structure. FIG. 3(a) shows an individual swirler, and FIG. 3(b), the proposed hexagonal closed pack structure of the swirler assembly. The size of the hexagons can be different based on the flow rate and velocity requirements of air, performance and manufacturability. While single swirler size for all the swirler units may help in assembly and manufacturability, smaller swirler size for the head end and larger sizes for the secondary zone might help in redistributing the air better. Some portion of the liner may have blanks, which are regions on the liner wall that dont have swirler and thus do not allow air into the combustor through them. The distribution of blanks and hexagonal swirlers is decided by the size of the engine and performance requirements like flow rates and combustion instability characteristics. Each swirler has each of its multiple vanes starting from the hub and ending at the hexagonal rim. The adjacent hexagons either share a common side or have some gap between them. The swirl vanes and the sides can be of different thicknesses depending on performance requirements. The angle of the vanes and the hub diameter can be varied based on the requirement of the swirl number for flame holding.

The pressure drop across this new arrangement is very low because of large openings for airflow. This improves the efficiency of the engine. This design also allows for thicker vanes which are easier to manufacture. While this increases the swirler mass, the decrease in material between swirlers reduces the overall mass of the combustor liner. Thus there is a net reduction in the overall liner weight. Since the liner is typically curved, machining and assembly of these individual swirlers are easier than the usual flat head ends. This can be done in primary zone and the secondary zone, for both can-type liner and annular-type liner. In case of the annular combustor, the inner liner wall will need to have higher gaps between the hexagons, to avoid problems during assembly due to the concave curvature.

Figure 3:
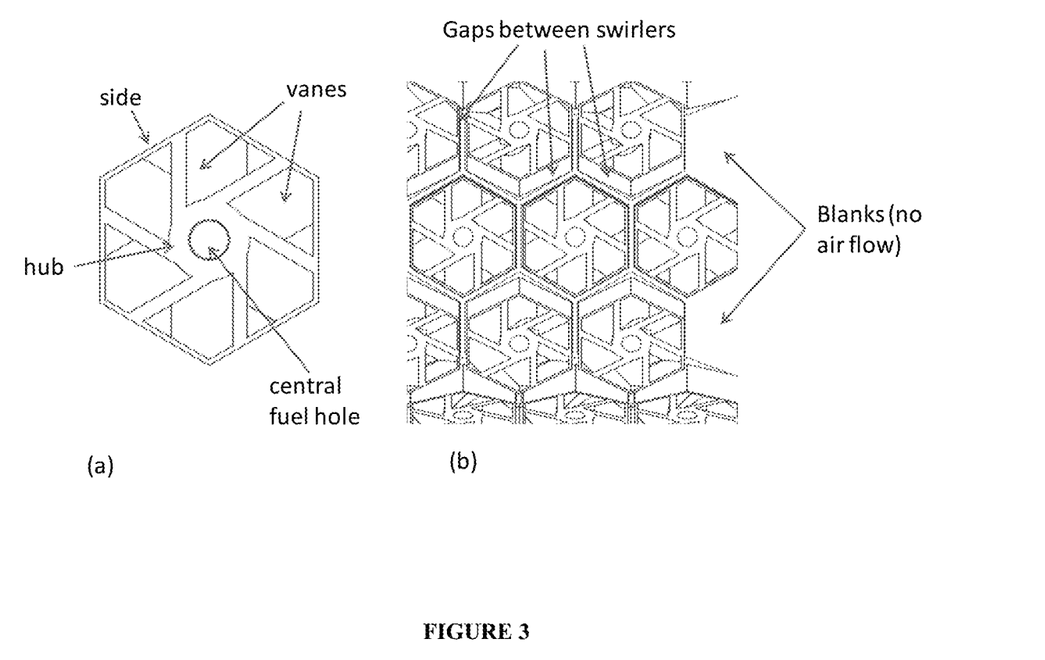
Figure 4:
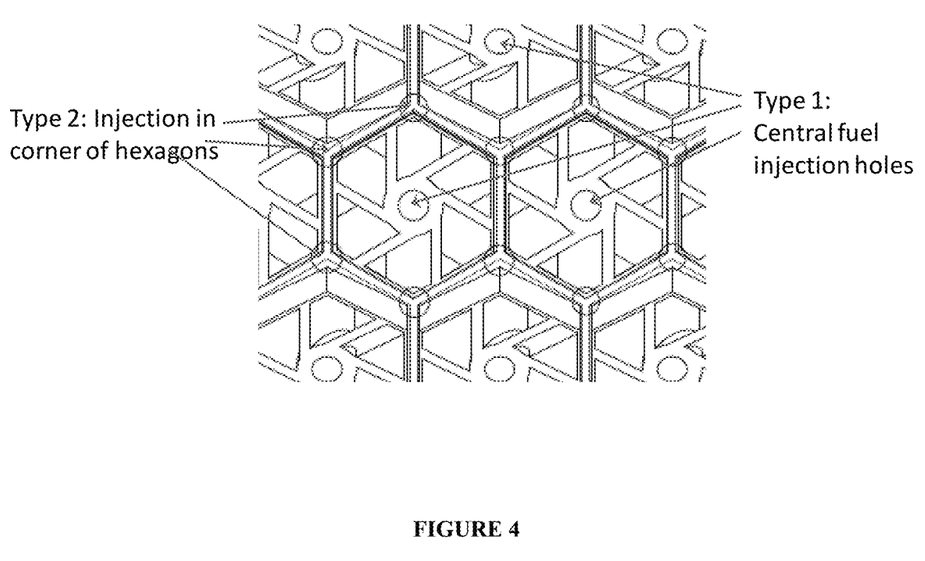
FIG. 4 shows fuel distribution to the hexagonal closed pack structure.

The manufacturing of the swirl mesh liner can be done through rapid prototyping, injection molding, sheet forming/ punching and/or six axis machining. There can also be a modular design where one can individually make a swirler, and then assemble them on the liner thru spot welding on a thin sheet (FIGS. 3 & 4).

The second main design, the "Lean Direct Injection" in this disclosure is that the fuel is distributed across multiple locations of the swirl mesh liner. This causes the local fuel flow rate at the injection point to be low. It is well known that nonpremixed flame lengths are proportional to the fuel flow rates; therefore, this causes shorter flames. There are three fuel injection types (FIG. 4) possible: 1) the hub of each of the swirlers has a nozzle in the center for fuel injection, 2) some/all of the corners of each of the hexagonal swirlers has a fuel injection nozzle, 3) a combination of both 1&2 above. In the last option, each of the swirler face can also be locally recessed in the center for the flame attached to the fuel injected there to act as a pilot flame to the other set of flames from the fuel injected at the peripheries between adjacent swirlers. The nozzle can be of varied sizes and designs depending on the required velocity and flow rate of the fuel, commensurate with the air flow rate and velocity. There are two different manifolds that supply fuel to the type 1 and type 2 injection locations.

Figure 5:
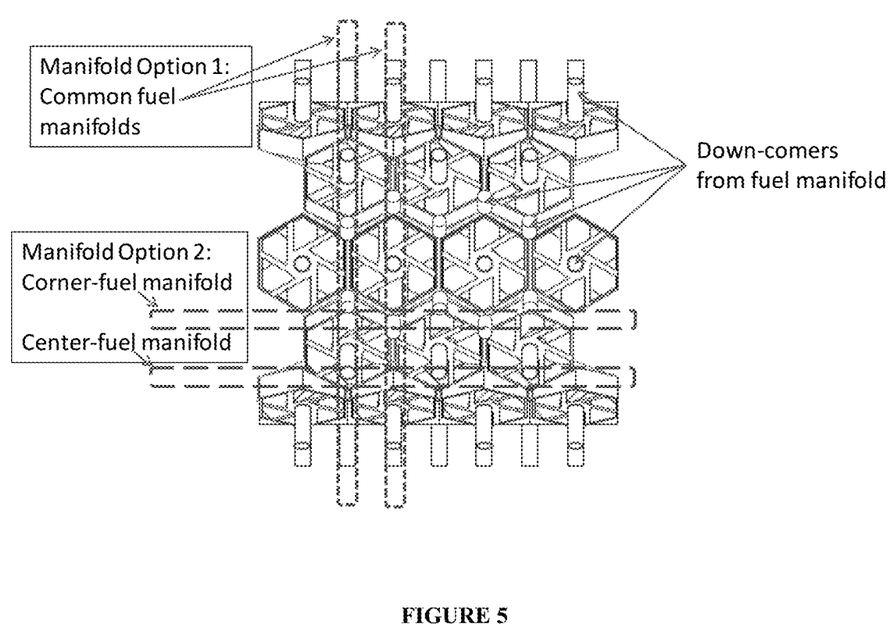
FIG. 5 depicts head end view of part of the liner design showing swirlers and fuel lines assembled.
Figure 6:
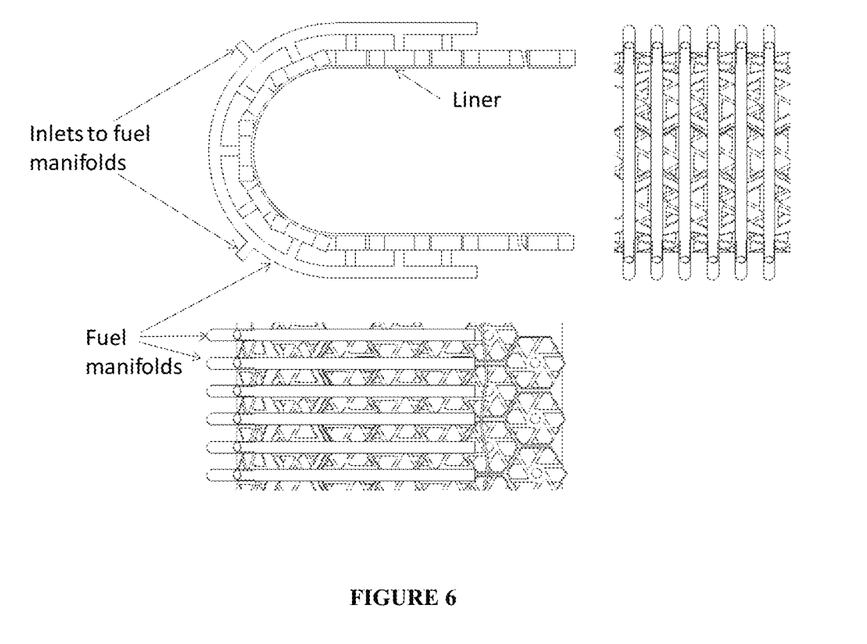
FIG. 6 shows assembled view of the liner including fuel manifold

The fuel supply to the nozzles can be done in any of the following ways: 1) direct supply from radially inward tubes, 2) from manifolds to individual nozzles, 3) single/multiple fuel injection manifolds being thin tubes hidden upstream of the swirl vanes, minimally affecting the air flow and providing variability in the fuel distribution across different ports (FIG. 5) and 4) fuel tubes embedded in the swirl vanes that are thicker than usual, as mentioned above. The fuel tubes can be welded to the liner and remachined for smooth finish.

Fuel manifolds can feed fuel to both type 1&2 injection holes, or there could be separate fuel manifolds for each type of injection holes. The fuel manifolds can be fed by separate lines to have separate pressures for injection if required. The fuel injection in the secondary zone may also be decoupled from that in the primary zone, by having separate manifolds for that region. There is more flexibility in terms of fuel distribution in the combustor for avoiding combustion instability. This can be done by injecting fuel in select locations in the secondary zone, thus modulating the acoustic field in the combustion chamber. The secondary zone can have variation in the air flow incoming from the swirler distribution and also from the fuel injection variation through those swirlers.

The option of having flame distributed along the wall of the liner gives the designers a handle to suppress combustion instability by removing flames that enhance instability and strengthen flames that reduce instability. With distributed fuel injection, one can even vary the fuel injection strategy actively to control combustion instability.

The fuel and air flow rates can be adjusted such that the combustor operates in the required overall fuel lean conditions with the maximum flame temperature being the same as the turbine inlet temperature. The velocities in the swirl mesh will be lower than existing designs due to larger opening in this design, also contributing to shorter flame lengths. Each swirler induces a swirling flow, which causes local flow field similar to single swirler case. However, since there are multiple such swirlers in this combustor, there is interaction between the vortices, causing highly turbulent flow field. The fuel injection at the center of the swirler provides flame stabilization whereas the fuel injection at the periphery between adjacent swirlers enhances shear based fuel-air mixing. This improves combustion efficiency and decreases CO and unburnt hydrocarbon emissions. The overall short, lean, distributed flame decreases the flame temperature, thus decreasing the NOx formation. Since the flame temperature itself is targeted to be the turbine inlet temperature, there are no hot spots in the combustor and the combustor exit temperature is uniform, leading to low radial pattern factor. The question of circumferential pattern factor does not even arise in the new design as it does not need the combustor to be a set of burners in an annulus (example: eighteen swirl cups in an annulus), but distributed all around the circumference of the annular combustor. The flame holding is done by mixing as the fuel and air streams meet, and the flame will be diffusion like flame, which is very stable if the velocities of the two streams are similar. Just after the flame holding point, the flame encounters the swirling flow and recirculation regions, causing the gases to mix well, and thus becoming close to premixed condition. Thus most of the flame experiences lean premixed combustion, while the flame stabilization region is close to a diffusion flame like situation, which is highly stable. This extends the operating regime of the combustor towards leaner conditions, leading to stable and safe operation. The overall lean premixed nature of the flame downstream of the stabilization point also aids in decreasing soot formation.

Diffusion flames are well known to respond less to acoustic excitations and therefore exhibit significantly lower amplitudes of combustion instability. In any case, the fuel supply system can be optimized to different operating conditions so as to spatially vary the flame strengths in such a way that the acoustic instability excited by one flame region is opposed by that caused by another flame region.

The maximum temperature anywhere in the combustor does not exceed the prescribed turbine inlet temperature that can be withstood by the turbine blades. Hence, the combustor and liner walls need not be cooled. In addition, since circumferential pattern factor is zero, the thermal fatigue to the turbine blades is eliminated. Together, these two effects extend the life of the turbine blades, the most critical component in a gas turbine.

It may be appreciated by those skilled in the art that the examples and detailed description herein are to be regarded in an illustrative rather than a restrictive manner.

We claim:

1. A method of holding flame with no combustion instability, low pollutant emissions, least pressure drop and flame temperature, in gas turbine engine combustors, said method comprising;
injecting fuel at several points in a combustion chamber using one or more fuel conduit, wherein
the one or more fuel conduit comprises one or more fuel manifolds, each having a fuel injection nozzle;
injecting air at the several point of fuel injection in the combustion chamber using a swirl mesh extending partially of fully along a liner located inside of the combustion chamber and extending longitudinally and circumferentially along the combustion chamber, wherein the swirl mesh is a set of hexagonal swirlers meshed with each other in hexagonal closed pack structure, and wherein each hexagonal swirler comprises:

a center and corners of the hexagonal swirler a hub at the center having a hub diameter a hexagonal rim surrounding the hub, and a set of vanes starting from the hub and ending at the hexagonal rim at an angle, wherein the angle of the set of vanes and the hub diameter are configured to vary based on requirements of a number of the hexagonal swirlers in the hexagonal closed pack structure for flame holding, said one or more fuel conduits extending longitudinally and circumferentially along with the liner and placed between the liner and an housing of the combustion chamber such that that the fuel injection nozzle extends through the swirl mesh for the fuel injection, and wherein the fuel injection nozzle extends through the swirl mesh at the center of each of the hexagonal swirler through the hub and at one or more corners at a periphery between adjacent hexagonal swirlers of the swirl mesh.

2. The method as claimed in claim 1, wherein injecting fuel at the several points in the combustion chamber comprises injecting lean direct fuel using the swirl mesh for distributed flame holding.

3. The method as claimed in claim 1, wherein the swirl mesh minimizes a solid mass between the swirler leads to lower total pressure loss and decreases a velocity of air in each swirler, the pressure loss is based on a wall thickness of a swirler vanes.

4. The method as claimed in claim 1 wherein a fuel injection at the hub of each of the hexagonal swirl mesh enhances flame stabilization while a fuel injection at one or more corners at the periphery between the adjacent hexagonal swirlers enhance shear-based fuel-air mixing.

5. The method as claimed in claim 1, wherein injecting fuel at the several points in the combustion chamber injecting a direct fuel at the several points in the combustion chamber to allow for overall fuel lean operation of the combustor with stable flame and to improve combustion efficiency with decreased CO and unburnt hydrocarbon emissions.

6. The method as claimed in claim 1, wherein injecting fuel at the several points in the combustion chamber injecting lean direct fuel along the swirl mesh to allow an overall fuel-air-ratio to be in a very lean range thereby decreasing a flame temperature and the pollutant emissions without affecting flame holding.

7. A gas turbine combustor for holding flame with no combustion instability, low pollutant emissions, least pressure drop and flame temperature, said gas turbine combustor comprising, a combustion chamber a liner located inside of the combustion chamber and extending longitudinally and circumferentially along the combustion chamber, said liner comprises of a swirl mesh extending partially of fully along the liner to inject air at several points of fuel injection in the combustion chamber, the swirl mesh is a set of hexagonal swirlers meshed with each other in hexagonal closed pack structure, and wherein each hexagonal swirler comprises:

a center and corners of the hexagonal swirler a hub at the center having a hub diameter a hexagonal rim surrounding the hub, and a set of vanes starting from the hub and ending at the hexagonal rim at an angle, wherein the angle of the set of vanes and the hub diameter are configured to vary based on requirements of a number of the hexagonal swirlers in the hexagonal closed pack structure for flame holding, wherein adjacent hexagonal swirlers in the hexagonal closed pack share a common side and having a gap, one or more fuel injection conduit to inject fuel at several points in the combustion chamber, wherein the fuel conduit comprises of one or more fuel manifolds, each having a fuel injection nozzle;

said one or more fuel conduits extending longitudinally and circumferentially along with the liner and placed between the liner and a housing of the combustion chamber such that the fuel injection nozzle extends through the swirl mesh for fuel injection and wherein the fuel injection nozzle extends through the swirl mesh at the center of each of the hexagonal swirler through the hub and at one or more corners at the periphery between adjacent hexagonal swirlers of the swirl mesh for fuel injection.

8. The gas turbine combustor as claimed in claim 7, wherein said swirl mesh with the hexagonal swirlers located below and along the line of housing of the combustion chamber to admit air into the combustion chamber.

9. The gas turbine combustor as claimed in claim 7, wherein size of the hexagonal swirlers are based on a flow rate and velocity requirements of air, performance and manufacturability.

10. The gas turbine combustor as claimed in claim 7 wherein the fuel injection at the center of each of the hexagonal swirler of the swirl mesh enhances flame stabilization while the fuel injection at one or more corners at the periphery between the adjacent hexagonal swirlers enhances shear-based fuel-air mixing.

* * * * *